United States Patent [19]
Ueda et al.

[11] 4,089,014
[45] May 9, 1978

[54] EXPOSURE CONTROL SYSTEM

[75] Inventors: Hiroshi Ueda, Nara; Masatake Niwa, Sakai, both of Japan

[73] Assignee: Minolta Camera Kabushiki Kaisha, Osaka, Japan

[21] Appl. No.: 745,993

[22] Filed: Nov. 30, 1976

[30] Foreign Application Priority Data

Dec. 10, 1975 Japan .................................. 50-146330

[51] Int. Cl.² .............................................. G03B 7/08
[52] U.S. Cl. ...................................... 354/38; 354/47; 354/231
[58] Field of Search .................... 354/29, 30, 36, 37, 354/38, 39, 47, 228, 231, 232

[56] References Cited
U.S. PATENT DOCUMENTS 3,964,073  6/1976  Kobori et al. ................... 354/38 X
3,972,055  7/1976  Matsuda et al. .................. 354/36 X Primary Examiner—L. T. Hix
Assistant Examiner—M. L. Gellner
Attorney, Agent, or Firm—Watson, Cole, Grindle & Watson

[57] ABSTRACT

In a camera exposure control mechanism having auto-to-manual switching for diaphragm control and a mechanism for selecting different exposure modes, apparatus is provided for switching the diaphragm control to manual control with the selection of either bulb or flash exposure irrespective of the selection of the exposure mode. An interrupting mechanism interrupts the operation of an automatically operated diaphragm stopping-down device to enable manual diaphragm control or bulb exposure control. The interrupting means selects manual diaphragm control with manual selection of the bulb or the flash exposure setting irrespective of the setting of auto-to-manual switch setting.

10 Claims, 5 Drawing Figures

EXPOSURE CONTROL SYSTEM

BACKGROUND OF THE INVENTION

This invention relates to camera exposure control mechanisms whereby diaphragm aperture control can be selectively effected automatically or manually. Existing camera exposure control mechanisms of this type provide various exposure modes accommodating the intentions of the operator, but have the following disadvantages.

Because of the essential nature of bulb exposure and flash exposure, the diaphgram should be controlled manually. There is provided means for allowing switching of the diaphragm control between the auto-and-manual positions. As a result, with either bulb exposure or flash exposure, the camera operator should pay attention to whether the auto-to-manual switching means has been switched to the manual diaphragm control setting. Otherwise, the camera operator would fail to obtain an optimum exposure if either bulb exposure or flash exposure is effected by automatic diaphragm control. As is apparent from the foregoing, the provision of auto-to-manual switching means for diaphragm control makes the use of a camera more complicated with respect to either bulb exposure or flash exposure operation.

SUMMARY OF THE INVENTION

It is an object of the present invention to provide a camera exposure control mechanism which permits auto-to-manual switching for diaphragm control, and avoids the aforesaid shortcomings of known exposure control mechanisms.

It is another object of the present invention to provide a camera exposure control mechanism which is provided with an auto-to-manual switching means for diaphragm control, and permits the selection of exposure modes, such as the automatic preferred aperture exposure mode, automatic preferred shutter speed exposure mode, programmed automatic exposure mode and the like, and in which for either bulb exposure or flash exposure, the diaphragm control is forcibly switched to manual control, irrespective of the aforesaid selection of the exposure mode.

DESCRIPTION OF THE PREFERRED EMBODIMENTS

Figure 1:
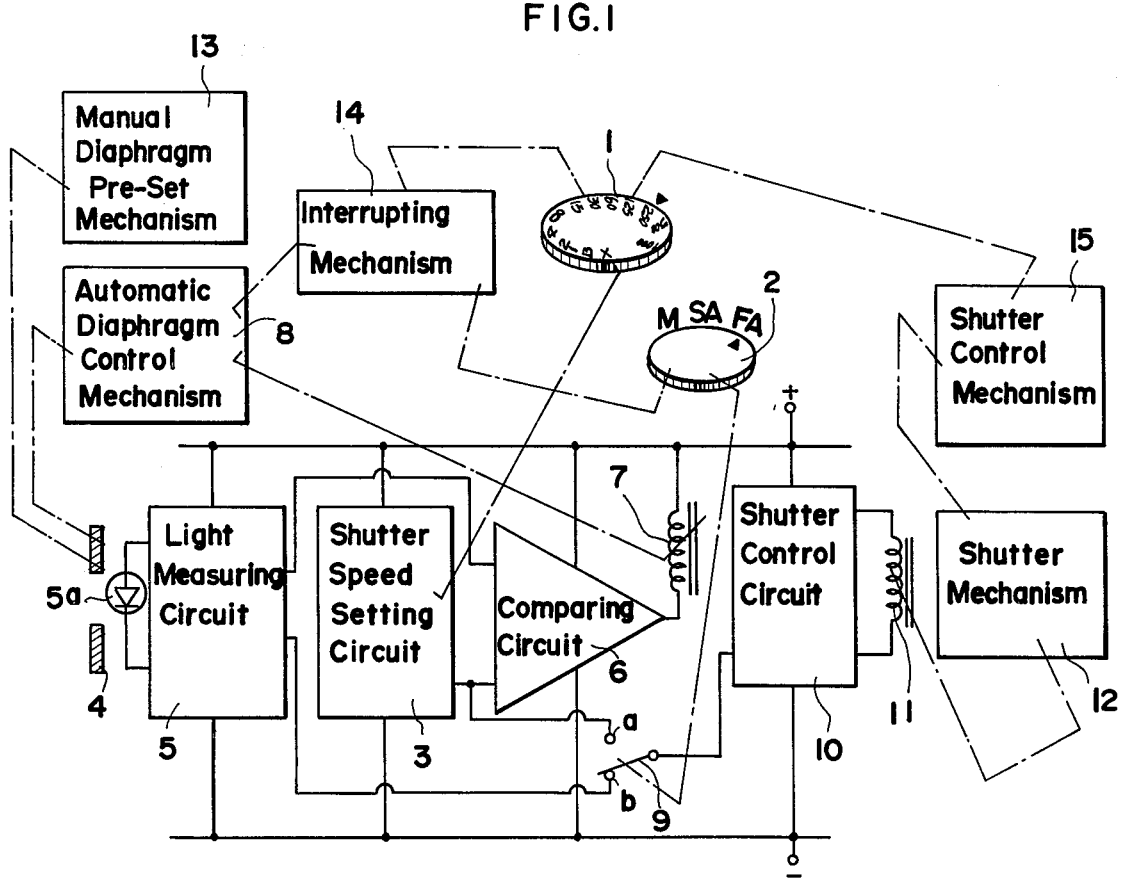
FIG. 1 is a block diagram showing the first embodiment of the invention.

With respect to FIG. 1, shutter speed setting dial 1 bears thereon numerals representing respective shutter speeds, character B representing bulb exposure, and character X representing a synchronized shutter speed for electronic flash exposure. Exposure mode switching dial 2 bears thereon character M representing manual shutter speed control, characters SA representing automatic shutter speed control, and characters FA representing F-stop automatic control.

A description will be first given for the case where the exposure mode switching dial is set to FA. Assume that shutter speed dial 1 is set at 1/250 sec., then shutter speed setting circuit 3 issues a shutter speed signal corresponding to 1/250 sec. When the camera is released for exposure, then diaphragm 4 begins to be stopped-down from its full open position toward its full stopped-down position. Light measuring circuit 5 receives on a light receiving element 5a the light which has passed through diaphragm 4, and then issues a signal which varies depending on the light intensity and information of the film speed. The signal from light measuring circuit 5 and the shutter speed signal from shutter speed setting circuit 3 are both provided to comparing circuit 6 for comparison. The signal from light measuring circuit 5 varies with the progress of the stopping-down operation of diaphragm 4. When the aforesaid signal of the light measuring circuit 5 becomes equal to the shutter speed signal, electromagnet 7 is controlled according to a signal from comparing circuit 6, and then automatic diaphragm control mechanism 8 is operated, thereby stopping the movement of diaphragm 4. In this manner, the size of the diaphragm aperture, i.e., the F-stop is automatically determined. Since mode switching dial 2 is set to FA in this case, switch 9 is switched to contact b. Shutter control circuit 10 controls shutter mechanism 12 by electromagnet 11, depending on the signal of the light measuring circuit 5, thereby determining the shutter speed. Meanwhile, the output of light measuring circuit 5 at this time is issued after the movement of diaphragm 4 has been stopped, and is substantially equal to the shutter speed signal from shutter speed setting circuit 3, so that the shutter speed to be set will be 1/250 sec., which has been set by means of the shutter speed setting dial. Accordingly, the exposure mode thus obtained in this manner will be an automatic preferred shutter speed exposure.

Manual diaphragm pre-set mechanism 13 manually presets the stopped-down position of diaphragm 4, independently of automatic diaphragm control mechanism 8. Accordingly, when manual diaphragm pre-set mechanism 13 presets the diaphragm to a minimum aperture value, the movement of the diaphragm is stopped exclusively by means of automatic diaphragm control mechanism 8, thereby providing the aforesaid automatic preferred shutter speed exposure.

However, when manual diaphragm preset mechanism 13 sets the diaphragm, for example to an aperture value of 5.6, and when the movement of diaphragm 4 is stopped by automatic diaphragm control mechanism 8, before diaphragm 4 is stopped down to 5.6, automatic preferred shutter speed exposure may be achieved. But, when the diaphragm is stopped down to 5.6, before the operation of automatic diaphragm control mechanism 8, then the movement of the diaphragm is stopped by manual diaphragm preset mechanism 13, so that the diaphragm may be set to an aperture value of 5.6. Accordingly, shutter control circuit 10 automatically determines the shutter speed, depending on the signal from light measuring circuit 5, which signal is dependent on the light passing through diaphragm 4 having its aperture value thus determined, thereby providing an automatic preferred aperture exposure.

Selection between the aforesaid exposure modes is automatically made based on the brightness of an object, so that programmed automatic exposure may result. Thus, when mode switching dial 2 is set to FA in this manner, either automatic preferred shutter speed exposure or programmed automatic exposure becomes possible.

In contrast thereto, when mode switching dial 2 is set to SA, interrupting mechanism 14 is operated in cooperation therewith, thereby preventing automatic diaphragm control mechanism 8 from stopping the movement of diaphragm 4. In other words, the movement of diaphragm 4 is stopped exclusively by manual diaphragm preset mechanism 13. Switch 9 is at contact b in this case, and shutter control circuit 10 automatically controls the shutter speed, depending on the signal of light measuring circuit 5. As a result, when mode switching dial 2 is set to SA, there results automatic preferred aperture exposure.

When mode switching dial 2 is set to M, then interrupting mechanism 14 is operated in cooperation therewith, so that the diaphragm may be set by means of manual diaphragm pre-set mechanism 13. Switch 9 is at contact a in this case, and shutter control circuit 10 controls shutter mechanism 12 for the shutter speed set by shutter speed setting dial 1, according to the shutter speed signal from shutter speed setting circuit 3, so that manual exposure results.

When shutter speed setting dial 1 is set to B or X for effecting bulb exposure or flash exposure, respectively, shutter control mechanism 15 is operated. More specifically, when shutter speed setting dial 1 is set to B, shutter control mechanism 15 mechanically controls shutter mechanism 12 in cooperation with the movement of a shutter release button (not shown). When shutter speed setting dial 1 is set to X, shutter control mechanism 15 mechanically controls shutter mechanism 12 for that predetermined shutter speed suited for an electronic flash exposure. Further, when shutter speed setting dial 1 is set to B or X, interrupting mechanism 14 is operated in cooperation therewith, so that diaphragm 4 may be set by means of manual diaphragm preset mechanism 13. As a result, even if mode switching dial 2 is set to FA, diaphragm 4 may be set by means of manual diaphragm pre-set mechanism 13 in the case of bulb exposure or flash exposure.

Figure 2:
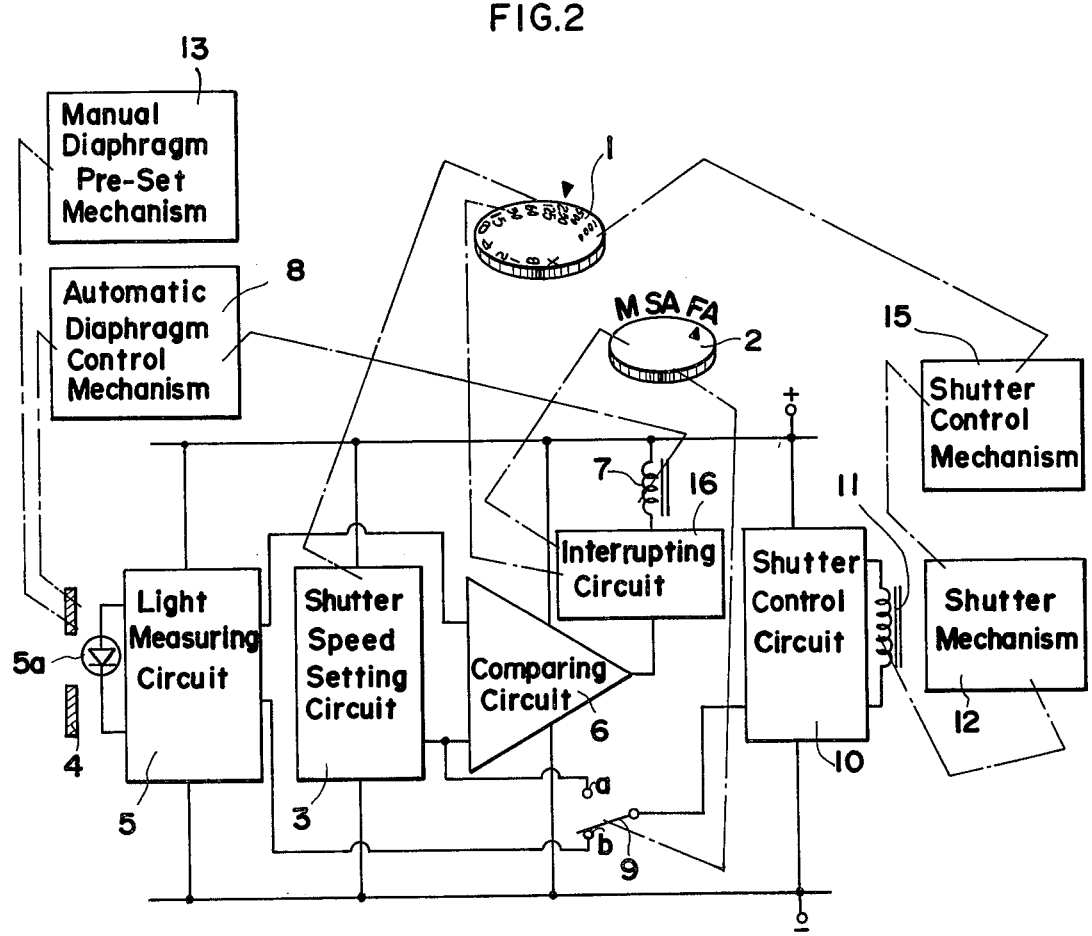
FIG. 2 is a block diagram of the second embodiment of the invention.

FIG. 2 shows the second embodiment of the present invention, wherein like parts are designated the same reference numerals as in FIG. 1. As shown in FIG. 1, there is provided interrupting mechanism 14 which is adapted to mechanically interrupt the function of the automatic diaphragm control mechanism operated by means of electromagnet 7. In contrast thereto, interrupting circuit 16 is shown in FIG. 2. More particularly, interrupting circuit 16 functions to maintain electromagnet 7 in its inoperable condition, even if a signal from light measuring circuit 5 becomes equal to the shutter speed signal from shutter speed setting circuit 3. In a practical application, as shown in FIG. 2, a signal from comparing circuit 6 may be interrupted from being transmitted to electromagnet 7 by interrupting circuit 16, or the operation of comparing circuit 6 itself may be interrupted electrically by the interrupting circuit. Interrupting circuit 16 electrically interrupts the operation of electromagnet 7, when mode switching dial 2 is set to M or SA, or when shutter speed setting dial 1 is set to B or X.

Figure 3:
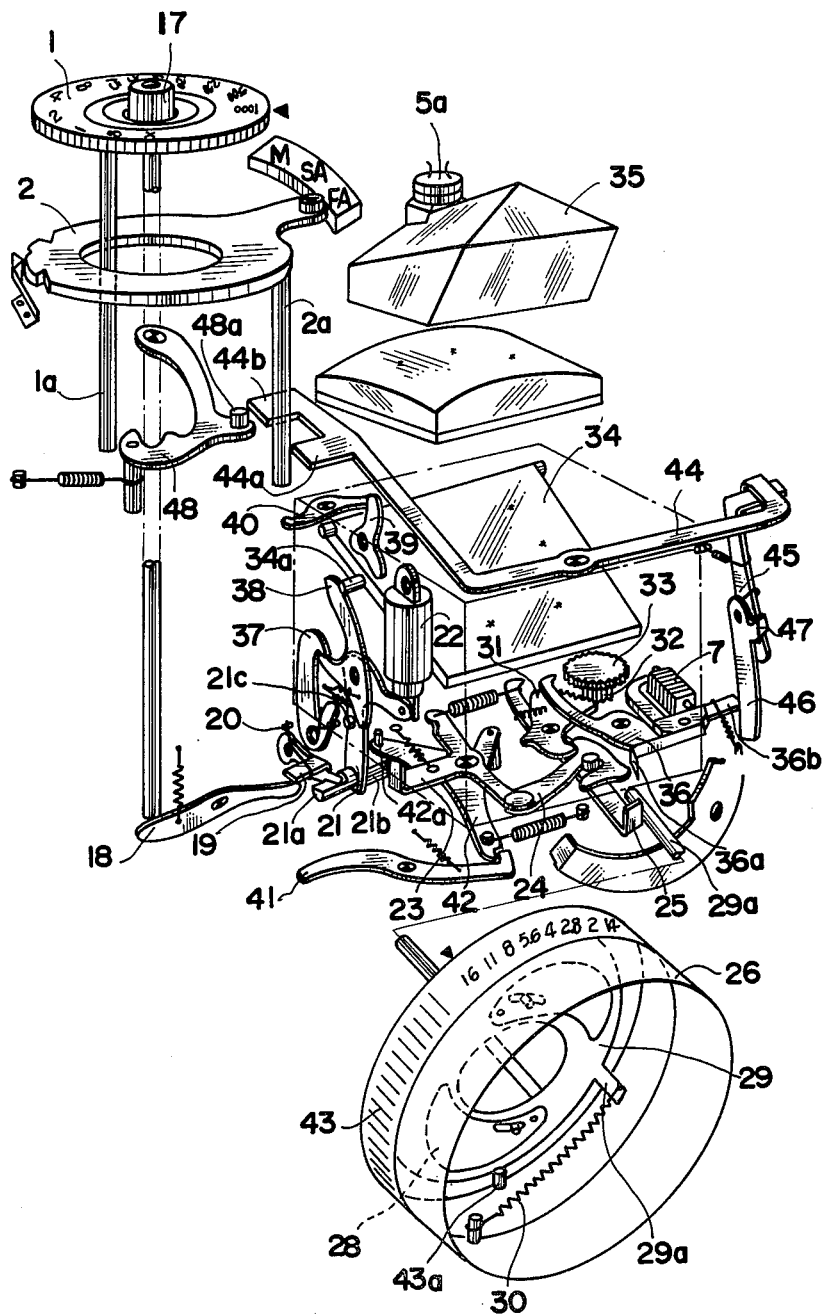
FIG. 3 is an exploded perspective detailed view of the structure of the embodiment of FIG. 1.

FIG. 3 is a detailed, exploded, perspective view of the mechanical components forming the embodiment of FIG. 1. The following description of the operation of the embodiment is with exposure mode switching dial 2 set to FA. Release lever 18 is rotated counterclockwise due to the depression of shutter button 17, whereby locking lever 19 is rotated counterclockwise against the force of spring 20. The rotation of locking lever 19 releases pin 21a, having a semi-circular cross section, from its locked condition, and provided on speed regarding lever 21, whereupon speed retarding lever 21 begins rotating clockwise, while being braked by air damper 22. As a result, following the movement of pin 21b, drive lever 23 is also rotated clockwise.

Connecting lever 24, pivoted to one end of drive lever 23, pulls diaphragm presetting member 25 so as to rotate the same clockwise, due to the rotation of drive lever 23. Interlocking pin 29a is maintained in engagement with diaphragm presetting member 25 and projects from diaphragm ring 29 which operates diaphragm blade 28 provided in exchangeable lens 26 mounted on the camera body. Accordingly, when diaphragm presetting member 25 rotates, diaphragm ring 29 follows its clockwise rotation under the action of spring 30, thereby stopping-down the diaphragm blades from their full open positions toward their full stopped-down positions.

In cooperation with the aforesaid movement, sector gear 31 rotates clockwise while being maintained in meshing relation with connecting lever 24. The rotation of sector gear 31 is transmitted by gear 32 to ratchet gear 33. Accordingly, when diaphragm ring 29 rotates, then ratchet gear 33 also may rotate in cooperation therewith. Light receiving element 5a in the light measuring circuit consists of a silicon photodiode, or other similar light receiving element, which is quickly responsive to light, and is mounted on pentagonal prism 35 so as to receive the light which has passed through the diaphragm aperture and has been reflected from movable mirror 34. When the signal from the light measuring circuit becomes equal to the shutter speed signal set by shutter speed setting dial 1, electromagnet 7 is demagnetized. Stop lever 36 is normally attracted to the position shown in FIG. 3 when electromagnet 7 is excited. However, when electromagnet 7 is demagnetized, then stop lever 36 rotates clockwise to mesh with ratchet gear 33, thereby stopping the rotation of ratchet gear 33. Accordingly, the rotation of diaphragm ring 29 is stopped, so that the diaphragm aperture is automatically set.

As has been described previously, after the diaphragm aperture has been set, speed retarding lever 21 further continues rotating counterclockwise, so that pin 21c on lever 21 engages mirror locking lever 37, thereby urging the same counterclockwise, and releasing mirror drive member 38 from its locked condition. As a result, mirror drive member 38 rotates clockwise, to drive pin 34a projecting from movable mirror 34, thereby rotating the movable mirror from its measuring position (as shown in FIG. 3) into its picture-taking position.

Simultaneously with the release of mirror drive member 38, a memory switch (not shown) in the light measuring circuit is opened. As a result, a signal representative of the brightness of object light which has passed through the adjusted diaphragm aperture (which signal also includes the film speed) is stored by a storage capacitor (not shown) and is utilized for the control of the shutter speed in a manner well known to those skilled in the art.

Further, when movable mirror 34 is driven to its picture-taking position, pin 34a rotates shutter release signal member 39 counterclockwise, thus causing leading shutter curtain locking lever 40 to rotate counterclockwise, thereby releasing the leading shutter curtain from its locked condition. Accordingly, the leading shutter curtain begins travelling and then the shutter beings opening.

Simultaneously with the commencement of travelling of the leading shutter curtain, a trigger switch (not shown) is actuated, thereby operating shutter control circuit 10 (FIGS. 1 and 2) according to information stored in a storage capacitor in light measuring circuit 5, while controlling the operation of an electromagnet for controlling the trailing shutter curtain, thus allowing the trailing shutter curtain to travel and close the shutter. In this manner, the exposure is controlled.

Upon completion of the travelling of the trailing curtain, trailing curtain signal member 41 is rotated clockwise, thereby releasing return lever 42 from its locked condition. As a result, return lever 42 is rotated counterclockwise, so that pin 42a pushes pin 21b. Accordingly, speed retarding lever 21 is rotated counterclockwise, so that pin 21c rotates mirror drive member 38 counterclockwise, thereby allowing movable mirror 34 to return from its picture-taking position to its viewing position. Pin 21b causes drive lever 23 to rotate counterclockwise and return to its initial position. As a result, diaphragm presetting member 25 is rotated counterclockwise, thereby urging diaphragm interlocking pin 29a on exchangeable lens 26 to return the diaphragm to its full open position.

Stop lever 36 is disengaged from ratchet gear 33 due to connecting lever 24 urging resilient bent portion 36a of stop lever 36 to rotate stop lever 34 counterclockwise to the position shown in FIG. 3. As a result, sector gear 31 is rotated counterclockwise to the position shown in FIG. 3, thereby allowing ratchet gear 33 to return to its initial position. In the above manner, the automatic preferred shutter speed exposure is achieved.

Diaphragm setting ring 43 rotates to vary the position of stopper member 43a, which is for stopping the rotation of diaphragm ring 29 by means of the engagement of bent portion 29a with stopper member 43a.

Accordingly, if bent portion 29a does not abut the stopper 43a until the diaphragm is stopped-down to its fully stopped-down position, then the movement of diaphragm ring 29 is stopped down by deenergization of electromagnet 7, thereby also allowing automatic preferred shutter speed exposure. In contrast thereto, the position of stopper member 43a is set so that bent portion 29a may abut stopper member 43a when the diaphragm is stopped-down to 5.6, then programmed automatic exposure becomes possible. In other words, if electromagnet 7 is demagnetized before the diaphragm is stopped down to an aperture value of 5.6, there results automatic preferred shutter speed exposure. When bent portion 29a abuts stopper member 43a, before electromagnet 7 is demagnetized, there results automatic preferred aperture exposure at an aperture value of 5.6.

Members 44, 45 and 46 constitute an interrupting mechanism such that when mode switching dial 2 is set to M or SA, even if electromagnet 7 is demagnetized, the rotation of ratchet gear 33 will not be stopped by stop lever 36, but the aperture value is determined exclusively by bent portion 29a abutting stopper member 43a. In other words, when mode switching dial 2 is set to FA as shown in FIG. 3, lever 46 is kept away from the righthand end 36a of stop lever 36, so that it rotates clockwise, upon demagnetization of electromagnet 7, to engage ratchet gear 33.

In contrast thereto, when mode switching dial 2 is set to M or SA, pin 2a urges projecting portion 44a of lever 44 to rotate lever 44 clockwise and lever 45 also rotates clockwise. Since levers 45 and 46 are coupled to rotate in the same direction by spring 47, lever 46 rotates clockwise, thereby urging the righthand end 36b of stop lever 36 to mechanically urge stop lever 36 against electromagnet 7. Thus, stop lever 36 cannot be rotated clockwise, even after the electromagnet has been demagnetized, and the rotation of the ratchet gear 33 is not stopped.

When shutter speed setting dial 1 is set to B or X, pin 1a contacts the inner edge of lever 48, rotating it counterclockwise. As a result, pin 48a urges projecting portion 44b to rotate lever 44 clockwise. Thus, when shutter speed setting dial 1 is set to B or X, irrespective of the fact that mode switching dial 2 is set to either M, SA, FA, lever 46 may be rotated clockwise, the stop lever 36 is mechanically urged against electromagnet 7, thereby preventing the rotation of ratchet gear 33 from being stopped.

Figure 4:
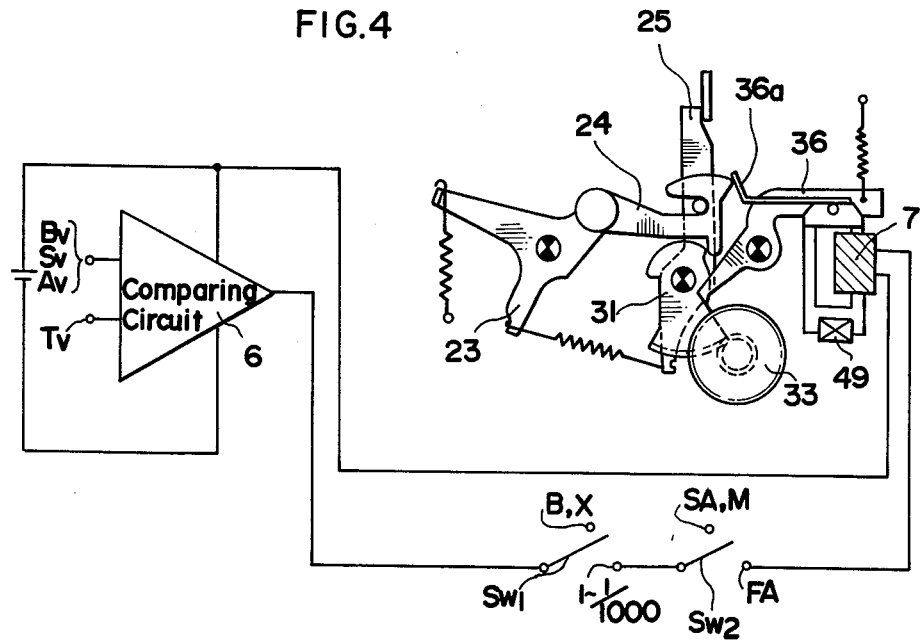
FIG. 4 is a plan view and a circuit diagram of an essential part of the embodiment of FIG. 2 in detail.
Figure 5:
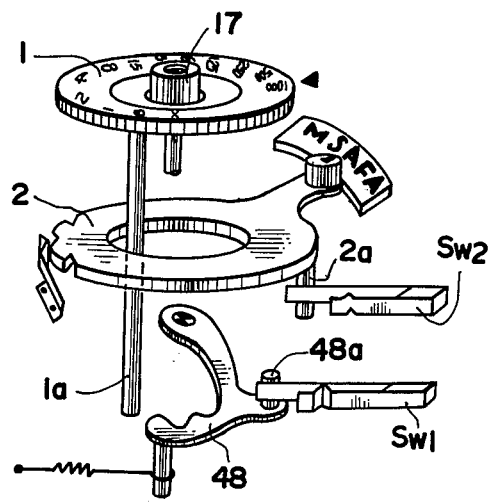
FIG. 5 is an exploded, perspective view of another portion of the embodiment of FIG. 4.

FIGS. 4 and 5 show detailed arrangements of the embodiment of FIG. 2 and like parts in FIGS. 4 and 5 are designated the same reference numerals as those of FIG. 3. According to the arrangement shown in FIG. 4, permanent magnet 49 is provided in a core of the electromagnet to attract stop lever 36 thereto due to the magnetic force produced by the permanent magnet. As shown in FIG. 5, switch SW1 is maintained closed when shutter speed setting dial 1 is set to 1 to 1/1000 sec. When shutter speed setting dial 1 is set to B or X, switch SW1 is opened by pin 1a, lever 48 and pin 48a. Additionally, when mode switching dial 2 is set to FA, switch SW2 is kept closed, and when mode switching dial 2 is set to M or SA, switch SW2 is kept opened. Accordingly, when electromagnet 7 is excited to have a polarity opposite to that of permanent magnet 49 according to a signal from comparing circuit 6 with both of switches SW1 and SW2 closed, stop lever 36 is rotated counterclockwise, thereby stopping the rotation of ratchet gear 33. However, when either one of switches SW1 and SW2 is kept opened, a signal from the comparing circuit will not be provided to electromagnet 7, so that stop lever 36 remains attracted to permanent magnet 49, and thereby the rotation of ratchet gear 33 is not stopped. As is apparent from the foregoing description, according to the arrangements shown in FIGS. 4 and 5, the rotation of ratchet gear 33 is prevented from being stopped, when shutter speed setting dial 1 is set to B or X, irrespective of the setting of mode switching dial 2.

What is claimed is:

1. Exposure control system for a camera comprising:
    a first operable member for selecting shutter speed having a plurality of selectable positions including bulb exposure to generate a shutter speed signal corresponding to a selected position;
    a diaphragm having a fully open position and movable upon camera release operation toward and fully stopped-down position;
    a light measuring circuit for receiving light through said diaphragm to produce a brightness signal dependent upon the intensity of the received light;
    means for automatically stopping the movement of said diaphragm with said brightness signal at a predetermined relationship with said shutter speed signal;
    means for manually pre-setting a position at which the movement of said diaphragm is stopped between said fully open position and said fully stopped-down position;

first means for selectively interrupting the operation of said means for automatically stopping to enable manual diaphragm control; and second means for interrupting the operation of said means for automatically stopping with said first operable member set at the bulb exposure position.

2. Exposure control system as in claim 1, wherein said first operable member further includes a flash position to set a predetermined shutter speed suitable for electronic flash photography and said second means for interrupting also interrupts the operation of said means for automatically stopping with said first operable member set at said flash position.

3. Exposure control system as in claim 2 further comprising first means for controlling the shutter speed in accordance with said shutter speed signal determined by said first operable member.

4. Exposure control system as in claim 3 further comprising second means for controlling the shutter speed in accordance with the signal produced by said light measuring circuit with the movement of said diaphragm stopped.

5. Exposure control system as in claim 4 further comprising a second operable member movable between a first position selecting said first shutter speed controlling means and activating said first interrupting means, a second position selecting said second shutter speed controlling means and activating said first interrupting means, and a third position selecting said second shutter speed controlling means without activating said first interrupting means.

6. Exposure control system as in claim 5, wherein said means for automatically stopping includes a circuit for comparing the signal produced by said light measuring circuit with said shutter speed signal, an electromagnet controlled by the output of said comparing circuit, and a mechanism for stopping the movement of said diaphragm controlled by said electromagnet.

7. Exposure control system as in claim 6, wherein said first and second means for interrupting interrupts the operation of said mechanism for stopping.

8. Exposure control system as in claim 6, wherein said first and second means for interrupting interrupts the operation of said electromagnet.

9. Exposure control system for a camera comprising:

first means for manually selecting between shutter speed settings and a bulb exposure setting;

second means for automatically controlling the diaphragm aperture in accordance with the scene brightness;

third means for manually controlling the diaphragm aperture;

fourth means for manually selecting between said second and third means; and fifth means for selecting manual diaphragm control with the bulb exposure setting manually selected, irrespective of the selection by said fourth means.

10. Exposure control system as in claim 9, wherein said first means includes a predetermined shutter speed setting suitable for electronic flash photography and said fifth means is capable of selecting manual diaphragm control with said predetermined shutter speed setting manually selected, irrespective of the selection by said fourth means.

* * * * *